(12) United States Patent
Sakaguchi

(10) Patent No.: US 6,246,539 B1
(45) Date of Patent: Jun. 12, 2001

(54) DISK CHUCKING MECHANISM

(75) Inventor: Takahiro Sakaguchi, Kokubunji (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/404,188

(22) Filed: Sep. 24, 1999

(30) Foreign Application Priority Data

Sep. 25, 1998 (JP) .................................................. 10-271979

(51) Int. Cl.$^7$ .......................... G11B 17/028; G11B 19/20
(52) U.S. Cl. ..................................... 360/99.05; 360/99.12
(58) Field of Search ............................. 360/99.12, 99.08, 360/99.04, 99.05; 369/264, 270, 271

(56) References Cited

U.S. PATENT DOCUMENTS

| | | | | |
|---|---|---|---|---|
| 4,658,311 | * | 4/1987 | Sakaguchi | ........................ 360/99.08 |
| 5,128,818 | * | 7/1992 | Koizumi et al. | .................. 360/99.04 |
| 5,715,115 | * | 2/1998 | Takarasawa et al. | ............. 360/99.05 |
| 6,061,215 | * | 5/2000 | Tomita | ................................. 360/133 |

FOREIGN PATENT DOCUMENTS

| | | | |
|---|---|---|---|
| 1-241055 | * | 9/1989 | (JP) . |
| 1-271961 | * | 10/1989 | (JP) . |
| 6-076441 | * | 3/1994 | (JP) . |

* cited by examiner

*Primary Examiner*—William Klimowicz
(74) *Attorney, Agent, or Firm*—Anderson, Kill & Olick P.C.

(57) ABSTRACT

A disk chucking mechanism for selectively chucking floppy disks onto a turntable has a strong neodym first magnet provided on an inner periphery of the turntable so as to attract a first hub and a second hub, and a weaker ferrite second magnet positioned low on an outer periphery of the turntable opposite a projection formed on the second hub and attracting only this second hub. By using these two magnets a satisfactory clamping of the floppy disks to the turntable can be achieved even when both lower grade (ordinary) and upper grade (high-density) floppy disks are loaded and driven.

3 Claims, 7 Drawing Sheets

DISK CHUCKING MECHANISM

BACKGROUND OF THE INVENTION

1. Field of the Invention

The present invention relates generally to a disk chucking mechanism, and more particularly, to a disk chucking mechanism that uses a magnet to attract a hub provided on a magnetic disk.

2. Description of the Related Art

The conventional floppy disk chucking mechanism has involved a metallic hub positioned at the center of a magnetic disk or other recording medium. FIG. 1, for example, shows an expanded view of the vicinity of a hub 102A of a lower grade or ordinary floppy disk 100A. As shown in the diagram, a hub 102A made of a magnetic metal, that is, a metal that is attracted by a magnet, is positioned in the center of the magnetic disk 103A. A roughly square chucking hole 104A is formed in a bottom portion 107 of the hub 102A. Additionally, a similarly roughly square positioning hole 105 is formed in the bottom portion 107 of the hub 102A at a position offset from the position of the chucking hole 104A.

FIG. 2A is a schematic diagram of a disk chucking mechanism 110 mounted on a conventional magnetic disk drive into which a lower grade or ordinary floppy disk 100 has been loaded. As shown in the diagram, the disk chucking mechanism 110 comprises a turntable 111, a spindle 112, a chuck magnet 114 and a drive pin 115.

The turntable 111 is supported by the spindle 112 via a supporting portion 113. The spindle 112 is constructed so as to be rotatably driven by a disk motor not shown in the diagram. The chuck magnet 114 is formed in the shape of a ring and positioned on top of the turntable 111 in such a way as to surround the supporting portion 113.

The drive pin 115 is positioned so as to correspond to the position at which the positioning hole 105 noted above is formed. This drive pin 115 is constructed so as to be movable in the Z1-Z2 direction depicted in the diagram by a leaf spring positioned at the bottom of the drive pin 115.

FIG. 2B shows a state in which the lower grade or ordinary floppy disk has been loaded into the disk chucking mechanism 110. At the time the lower grade or ordinary floppy disk 100A is loaded the hub 102A is attracted to the chuck magnet 114 and set upon the turntable 111. In such a state, it is sometimes the case that although the spindle 112 penetrates the chucking hole 104A the drive pin 115 does not penetrate the positioning hole 105. It should be noted that in this case the drive pin 115 moves in the Z2 direction due to the elastic deformation of the leaf spring 116.

If in the state described above the disk motor drives the turntable 111 via the spindle 112, then this rotation matches the positioning hole 105 to the drive pin 115 and the rotational force of the disk motor is then transmitted to the hub 102A.

That is, in the disk chucking mechanism 110 as described above, the rotational force of the disk motor is transmitted to the lower grade or ordinary floppy disk 100A via the drive pin 115 and, at the same time, serves both to position the hub 102A on top of the turntable 111 and to support the hub 102A. As a result, the attractive force of the chuck magnet 114 does not contribute to the rotating of the lower grade or ordinary floppy disk. Accordingly, the attractive force of the chuck magnet 114 should be relatively weak, that is, just enough so that the hub 102A does not separate from the turntable 111. Separately, an index signal is emitted at the lower grade or ordinary floppy disk drive in order to determine the starting point of the disk that rotates in tandem with the position of the drive pin 115.

However, ever-larger capacity floppy disks and magnetic disk drives using these large-capacity floppy disks to magnetically record and reproduce have been and continue to be developed for the lower grade or ordinary floppy disk 100A and magnetic disk drive noted above. With the higher grade or high-density floppy disk drive the load that the magnetic head imparts to the rotation of the disk is small and moreover the load that the protective liner inside the disk cartridge imparts to the disk is set so as to be low, so there is no expectation of accurate positioning and support by the drive pin 115. Further, there is no emission of an index signal linked to the drive pin 115.

As a result, as shown by the expanded view depicted in FIG. 3 a circular chucking hole 104B is provided on a central portion 108 of the hub 102B of the higher grade or high-density floppy disk 100B and, at the same time, a peripheral portion of the hub 102B is formed into a ring-like projection 106. Unlike the lower grade or ordinary floppy disk 100A, the load torque on the rotation of the higher grade or high-density floppy disk 100B decreases and therefore the spindle 112 and the drive pin 115 cannot be expected to support the hub 102B, with the result that the positioned state is maintained only by the friction between the hub 102A and the turntable 111.

However, a so-called compatible magnetic disk drive has been proposed that makes it possible to magnetically record and reproduce on both the lower grade or ordinary floppy disk 100A and the higher grade or high-density floppy disk 100B using a single floppy disk drive. The compatible disk drive makes it possible to use the conventional lower grade or ordinary floppy disk 100A as is.

Conventionally, the disk chucking mechanism mounted on the compatible disk drive is the same disk chucking mechanism 110 mounted on the lower grade or ordinary floppy disk drive described above.

FIG. 2C shows a state in which the higher grade or high-density floppy disk 100B is loaded into the disk chucking mechanism 110. When loading, the center portion 108 of the hub 102B provided on the higher grade or high-density floppy disk 100B is attracted to the chuck magnet 114 and set on top of the turntable 111. In this condition, the spindle 112 enters the chucking hole 104B.

However, when the lower grade or ordinary floppy disk drive disk chucking mechanism is used as the disk changing mechanism of the convertible disk drive, the position of the floppy disk on top of the turntable 111 fluctuates due to external vibrations.

Increasing the strength of the chuck magnet 114 is one possible method of eliminating these fluctuations. In so doing, however, the great strength of the chuck magnet 114 causes the hub 102A of the lower grade or ordinary floppy disk 100A to stop where it lands on top of the turntable 111, the hub 102A does not rotate on top of the turntable 111 and, accordingly, the drive pin 115 may not enter the positioning hole 105.

SUMMARY OF THE INVENTION

Accordingly, it is an object of the present invention to provide a disk chucking mechanism in which the problems described above are eliminated.

Another and more specific object of the present invention is to provide a disk chucking mechanism capable of achieving a satisfactory clamping of the floppy disks to the turntable even when both the higher grade or high-density floppy disk as well as the lower grade or ordinary floppy disk are loaded and driven.

The above-described objects of the present invention are achieved by a disk chucking mechanism comprising:
 a first disk having a first hub, the first hub having a chucking hole into which and through which a spindle is inserted and a positioning hole into which and through which a drive pin is inserted;
 a second disk having a second hub, the second hub having a second chucking hole into which and through which the spindle is inserted and a ring-like projection;
 a first magnet provided on an inner periphery of the turntable, the first magnet configured so as to attract the first hub and the second hub; and
 a second magnet provided on an outer periphery of the turntable, the second magnet having an attracting surface positioned further toward the outer periphery of the turntable than an attracting surface of the first magnet and opposite the projection formed on the second hub.

According to the invention described above, by providing a first magnet configured so as to attract both the first and second hubs the first magnet attracts the first and second hubs when the first and second disks are loaded.

Moreover, by providing a second magnet on the outer periphery of the turntable and configured so as to have an attracting surface positioned further outside the attracting surface of the first magnet and opposite the projection, this second magnet attracts only the projection provided on the second disk, so the second magnet does not attract the first hub when the first disk is loaded.

Nevertheless, it should be noted that the second magnet attracts and attaches the second hub when the second disk is loaded. In other words, when the second disk is loaded, the first and second magnets together attract and attach the second hub.

As a result, when the first disk is loaded, the attractive force exerted on the first hub is weak because it consists of only the first magnet, so when the disk motor is engaged the first hub rotates with the turntable and the drive pin can be inserted into the positioning hole. Also, when the second disk is loaded the attractive force exerted on the second hub is strong because it consists of both the first and second magnets, so the position of the second disk can be maintained by the force of friction with the turntable.

Additionally, the above-described objects of the present invention are also achieved by the disk chucking mechanism as described above, wherein the first magnet is a neodym magnet and the second magnet is a ferrite magnet.

According to the present invention, by using a neodym magnet for the first magnet and a ferrite magnet for the second magnet the effects described above can be achieved with greater efficiency. Also, the magnets may be made thin so as to make it possible to make the disk device thin as well.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A detailed description will now be given of a first embodiment of a disk device according to the present invention, with reference to the accompanying drawings.

Figure 4:
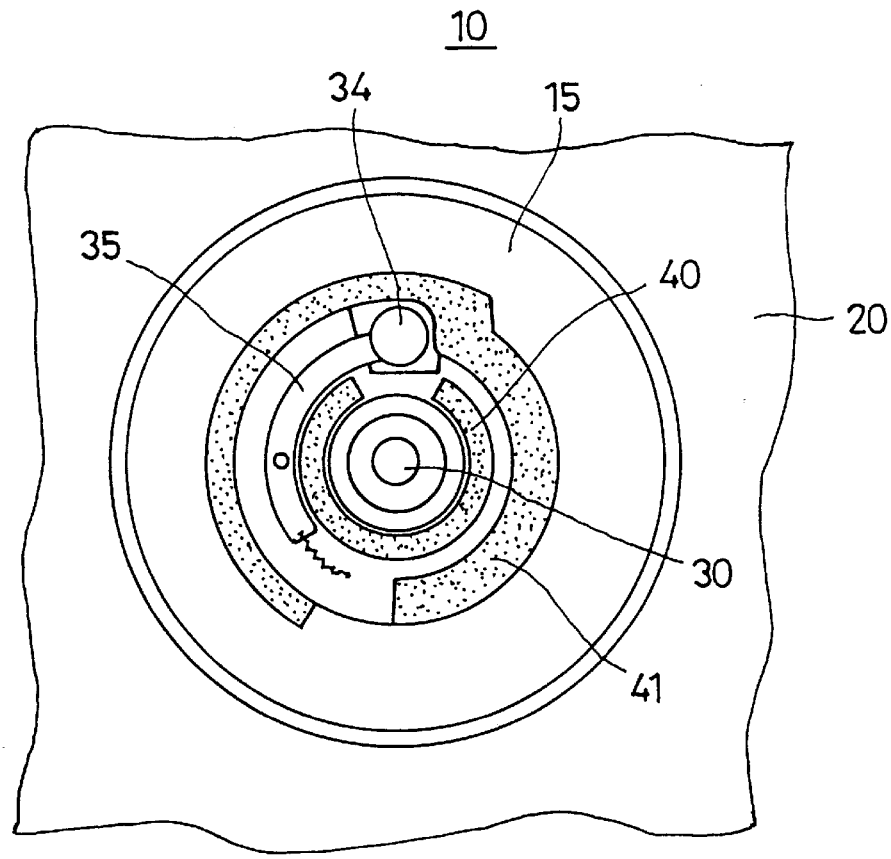
FIG. 4 is a plan view of an embodiment of a disk chucking mechanism according to the present invention.
Figure 5:
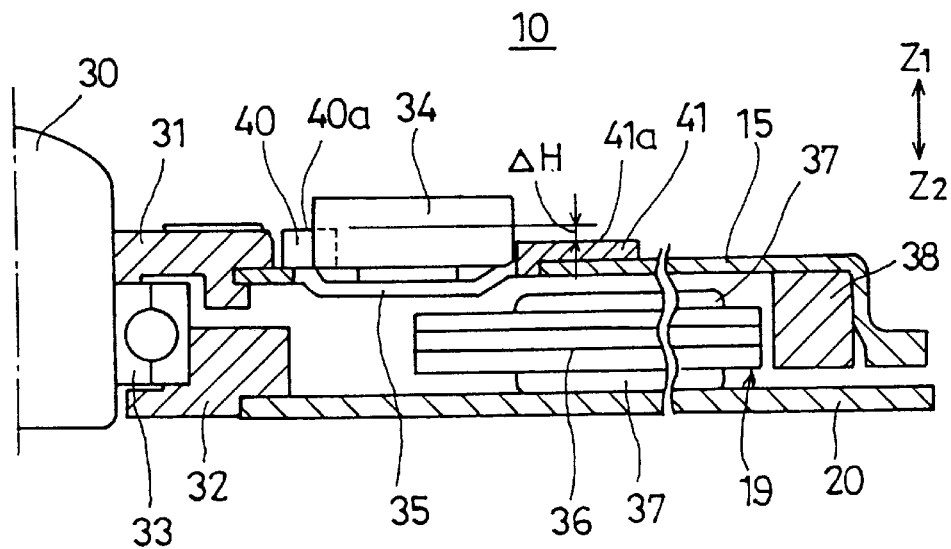
FIG. 5 is a cross-sectional view of an embodiment of a disk chucking mechanism according to the present invention.
Figure 6A:
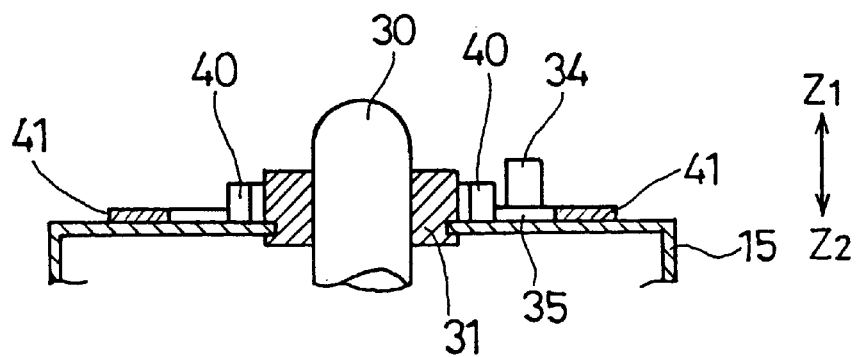
FIGS. 6A, 6B and 6C are diagrams for describing the operation of an embodiment of a disk chucking mechanism according to the present invention.
Figure 6B:
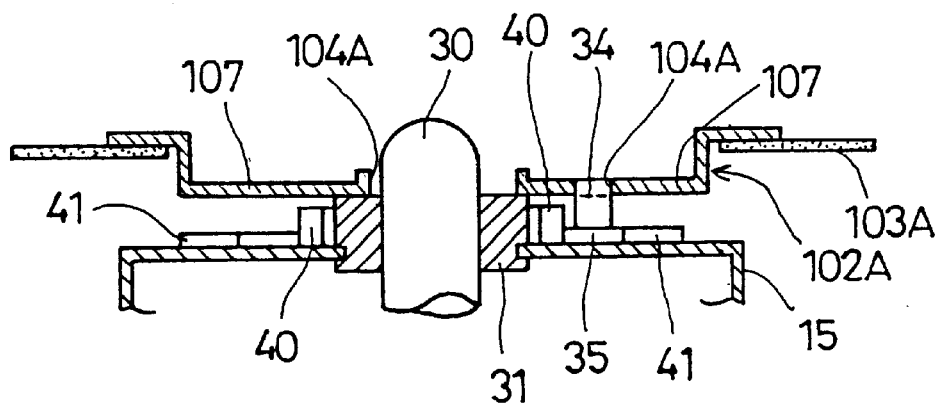
Figure 6C:
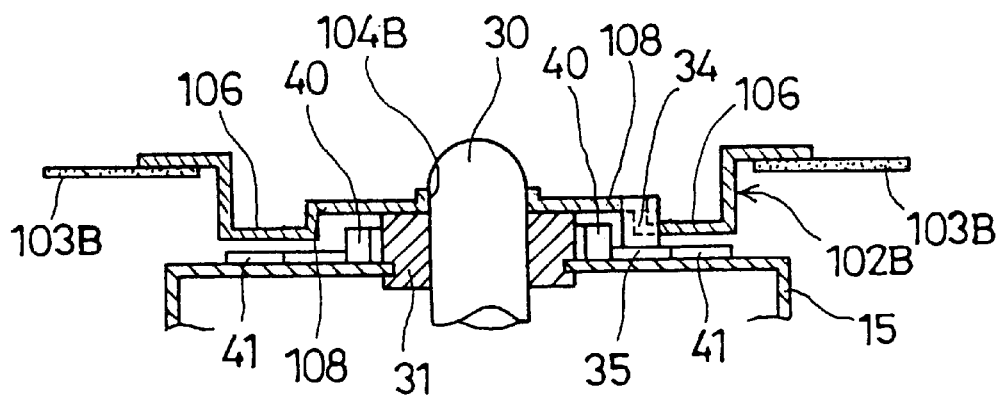

FIGS. 4, 5 6A, 6B and 6C are drawings of the disk chucking mechanism 10 that is one embodiment of the present invention. FIG. 4 is a plan view of the disk chucking mechanism 10, FIG. 5 is a cross-sectional view of the disk chucking mechanism 10 and, further, FIGS. 6A, 6B and 6C are diagrams illustrating the operation of the disk chucking mechanism 10.

Figure 1:
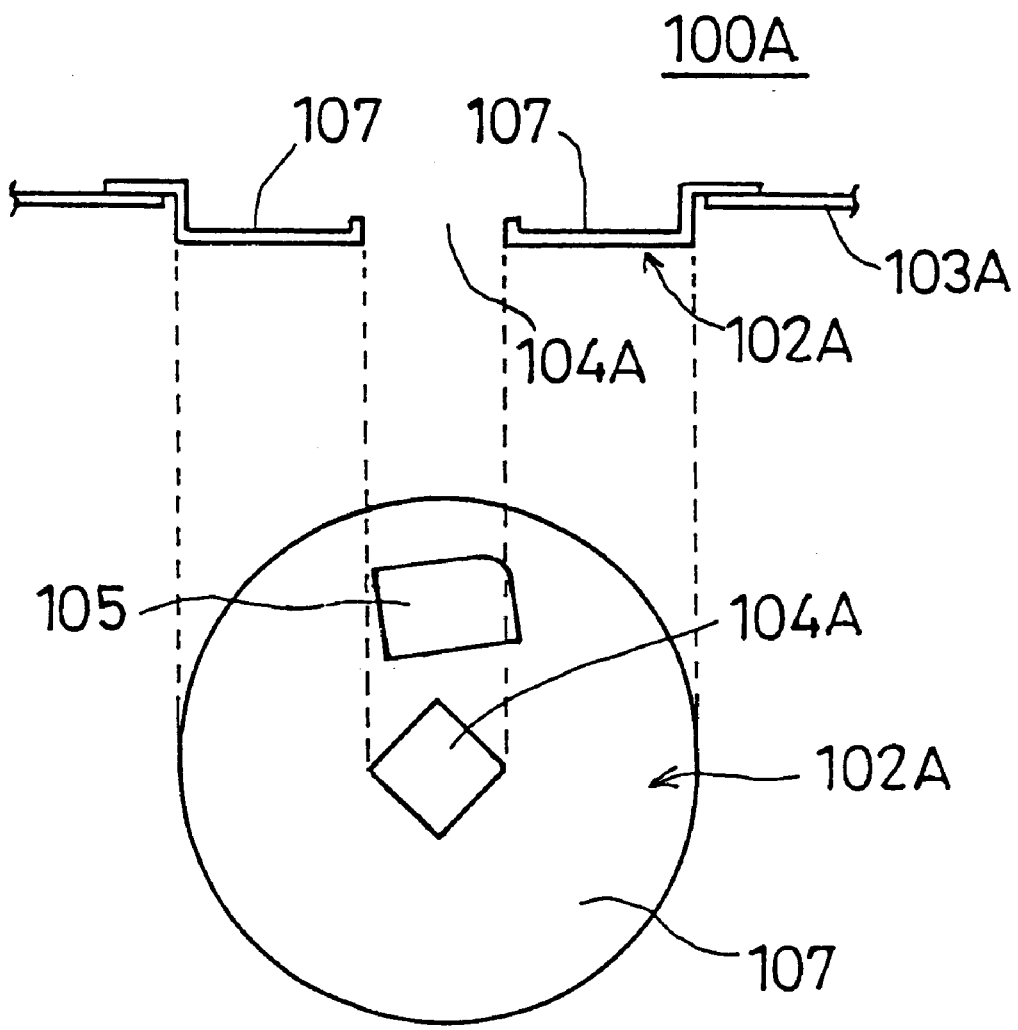
FIG. 1 is a diagram describing the hub of a lower grade or ordinary floppy disk drive.
Figure 2A:
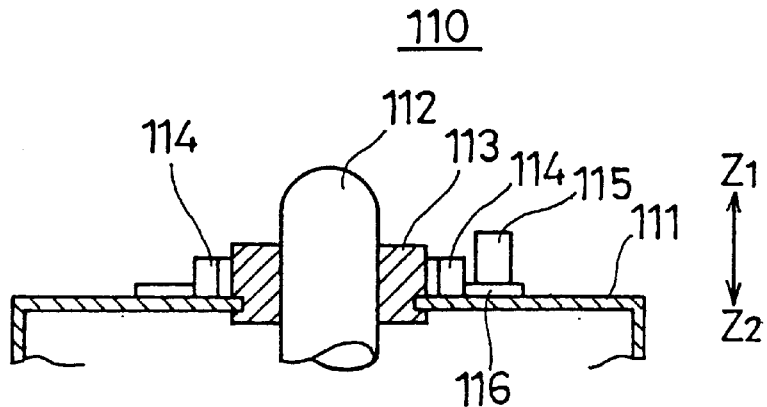
FIGS. 2A, 2B and 2C are diagrams describing the composition and operation of a conventional disk chucking mechanism.
Figure 2B:
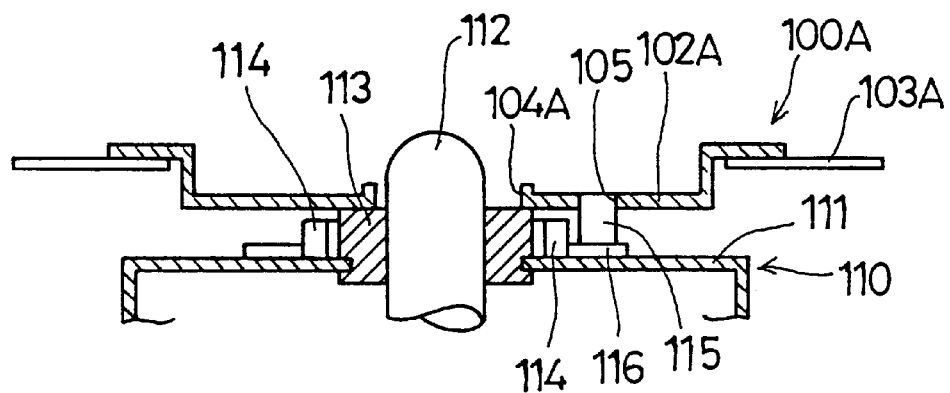
Figure 2C:
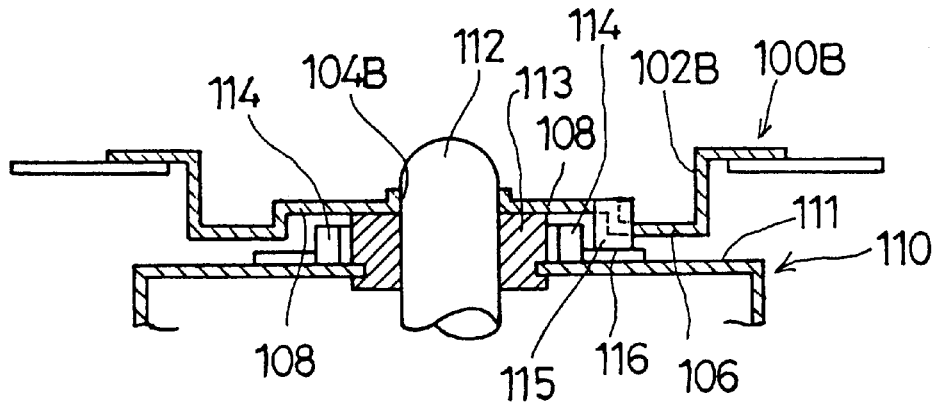
Figure 3:
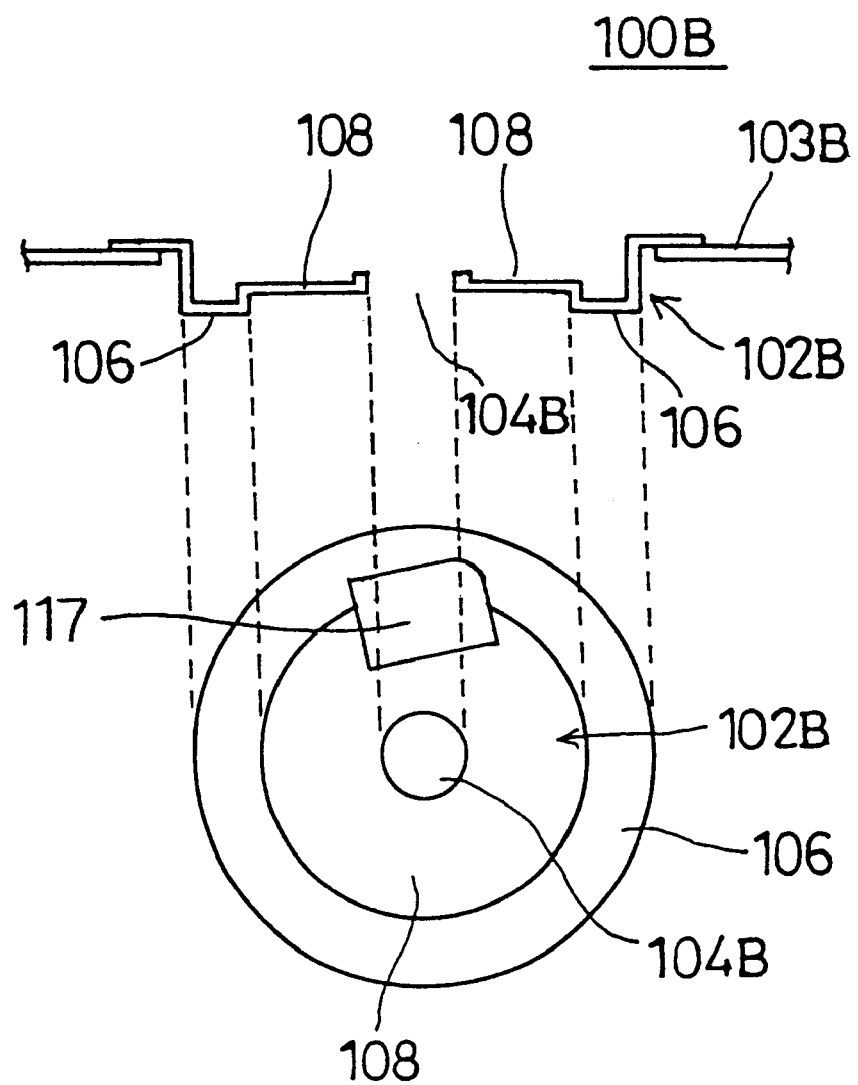
FIG. 3 is a diagram describing the hub of an higher grade or high-density floppy disk drive.

It should be noted that the same reference numbers 100A and 100B used in FIGS. 1 and 3 to indicate the lower grade or ordinary floppy disk and higher grade or high-density floppy disk, respectively, are also used in FIGS. 4, 5, 6A, 6B and 6C, and so a description thereof will be omitted.

Figure 8:
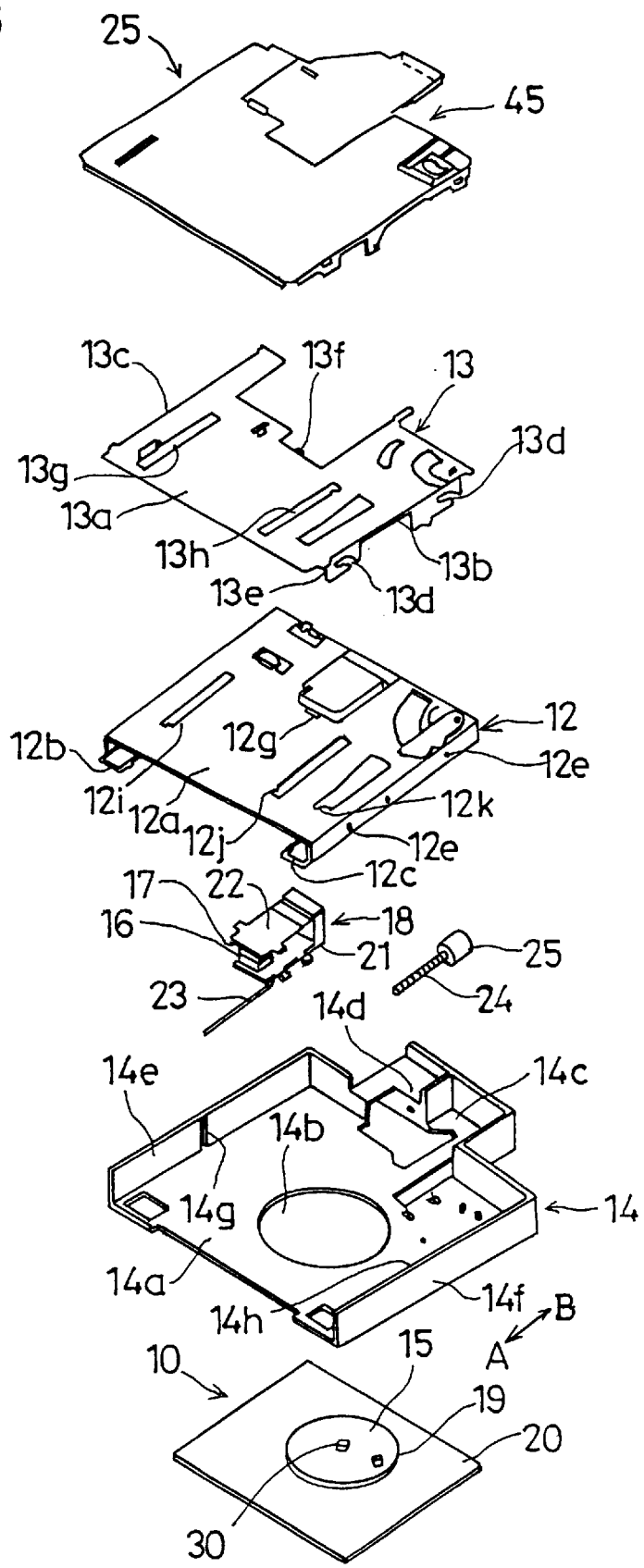
FIG. 8 is an exploded oblique view of an essential portion of a magnetic disk drive mounting an embodiment of a disk chucking mechanism according to the present invention.

The disk chucking mechanism 10 of the present embodiment is mounted on a compatible disk drive 11 that permits magnetic recording and reproduction by both the lower grade or ordinary floppy disk 100A and the higher grade or high-density floppy disk 100B on a single magnetic disk drive. FIG. 8, for example, shows one such compatible disk drive 11 mounting a disk chucking mechanism 10.

At this point a brief description of the composition of the compatible disk drive 11 is necessary before proceeding with a description of the disk chucking mechanism 10.

As shown in FIG. 8, the compatible disk device 11 consists of a frame 14, in which a disk holder 12 into which a disk cartridge (not shown in the drawing) is inserted and a sliding member 13 for raising and lowering the disk holder 12 by sliding the disk holder 12 back and forth are mounted so as to be stacked one atop the other.

The sliding member 13 is mounted so as to slide the disk holder 12 freely in the A, B direction. With the insertion of a disk cartridge the sliding member 13 slides in the A direction, thereby lowering the disk holder 12 from the cartridge insert/eject position to the cartridge load position.

The disk holder 12 consists of a cover 12a and two cartridge guide portions 12b and 12c formed by bending both sides of the cover 12a so as to enclose the disk cartridge. Accordingly, the space enclosed by the cover 12a and the two cartridge guide portions 12b and 12c on both sides of the cover 12a is the cartridge insertion portion.

The sliding member 13 has a plate 13a that slides over the top of the disk holder 12, side surfaces 13b and 13c formed by bending the two sides of the plate 13a downward, a slanted groove 13d provided on each of the two side surfaces that engages an engaging pin 12e provided on the disk holder 12, a contacting portion 13e that contacts the upper edge of the two side surfaces 14e and 14f of the frame 14, and an engaging portion 13f that engages a hole 12g provided on the center portion of the disk holder 12 when the disk cartridge is ejected.

Two openings 13g and 13h are provided on the plate 13a of the sliding member 13 so as to accommodate coil springs (not shown in the drawing) that push the sliding member 13 up and out in the A direction. As a result, the sliding member 13 is pushed upward and outward in the A direction by the force of the coil springs.

On the flat surface 14a of the frame 14 are provided a circular opening 14b, into which the turntable 15 is inserted to clamp the disk, and a carriage mounting portion 14c, on which is mounted so as to be slidable in the A, B direction a head carriage 18 that supports magnetic heads 16 and 17. Also, a motor mounting portion 14d is provided on the rear of the frame 14, on which is mounted a motor for driving the head carriage 18.

Additionally, guide grooves 14g and 14h for guiding the ascent and descent of the disk holder 12 are provided at approximately the midpoints of the two side surfaces 14e and 14f of the frame 14. Further, the disk chucking mechanism 10 is positioned on a bottom surface of the frame 14.

The disk chucking mechanism 10 has a turntable 15, a disk motor 19 for rotatably driving the turntable 15, and a circuit board 20 for mounting the turntable 15 and the disk motor 19. A detailed description of the disk chucking mechanism 10 will be provided later.

The head carriage 18 has a carriage main body 21 that supports the lower magnetic head 16 on the upper surface of its front edge and a head arm 22 mounted so as to be rotatable with respect to the carriage main body 21 and which supports the upper magnetic head 17 on the lower surface of its front edge.

Additionally, the carriage head 18 is guided by a guide shaft 23 extending forward and backward in the A, B direction and a lead screw 24 in such a way as to move a distance in the direction of rotation of the lead screw 24 corresponding to an amount by which the lead screw 24 has been rotated. Also, lead screw 24 screws into a screw hole (not shown in the drawing) located on a left side surface of an opposite side of the carriage main body 21.

The motor 25 that rotatably drives the lead screw 24 is mounted on a lower surface of the motor mounting portion 14d provided on the rear of the frame 14. As a result, the rotational drive force of the motor 25 that rotatable drives the lead screw 24 moves the head carriage 18 back and forth in the A,B direction while being guided by the guide shaft 23. Thus the magnetic heads 16 and 17 supported by the head carriage 18 can trace a desired track on a disk (not shown in the drawing) contained in the disk cartridge, and thereby magnetically record and reproduce.

Additionally, a cover 25 is mounted on top of the sliding member 13 so as to cover the top of the frame 14. The cover 25 is fixedly mounted by screws at both sides of the frame 14 so as to prevent the sliding member 13 from floating upward and, further, to guide the movement of the sliding member 13 back and forth in the A,B direction.

A description will now be provided of the disk chucking mechanism 10 to be mounted on the compatible disk drive 11 having the above-described composition.

As shown in FIGS. 4, 5, 6A, 6B and 6C, the compatible disk drive 11 comprises chiefly a turntable 15, a disk motor 19, a circuit board 20, a spindle 30, a drive pin 34, a first magnet 40 and a second magnet 41.

The turntable 15 is a disk-like member made of a magnetized metal, and is fixedly mounted on the spindle 30 via the holder 31. Accordingly, the turntable 15 and the spindle 30 together rotate as a single unit.

Additionally, the circuit substrate 20 is fixedly mounted on the frame 14 as can be seen in FIG. 5. A holder 32 that supports a bearing 33 is mounted on the circuit board 20, with the spindle 30 being rotatably supported by the bearing.

The disk motor 19 comprises a plurality of cores 36 and coils 37 (of which only one each is shown in the drawing) as well as a motor magnet 38 positioned on the turntable 15. The coil 37 is wound around the core 36, with the motor magnet 38 positioned opposite the core 36. Accordingly, by sending a current to each coil 37 at a predetermined time the motor magnet moves so as to rotate the turntable.

It should be noted that in the present embodiment the disk chucking mechanism 10 is mounted on a compatible disk drive 11, so the disk motor 19 rotation speed changes when the lower grade or ordinary floppy disk 100A is loaded and when the higher grade or high-density floppy disk 100B is loaded. Specifically, when the lower grade or ordinary floppy disk 100A is loaded the rotation speed decreases and when the higher grade or high-density floppy disk 100B is loaded the rotation speed increases.

The drive pin 34 is provided on the turntable 15, at a position corresponding to the position at which the positioning hole 105 Is formed on the hub 102A of the lower grade or ordinary floppy disk 100A. The drive pin 34 is constructed so as to be movable in the vertical Z1, Z2 direction by a leaf spring 35 provided at the bottom of the drive pin 34.

As shown in FIG. 4, the first magnet 40 is arranged along the top of the inner periphery of the turntable 15 in such a way as to almost entirely surround the spindle 30. A powerful neodym magnet is used as this first magnet 40 and, as will be described later, is constructed so as to attract both hubs 102A and 102B provided on the lower grade or ordinary floppy disk 100A and the higher grade or high-density floppy disk 100B, respectively.

At the same time, the second magnet 41 is arranged along the top of the outer periphery of the turntable 15 in such a way as to almost entirely surround the first magnet 40. A ferrite magnet, which is weaker than a neodym magnet, is used for this second magnet 41.

Additionally, the attracting surface 41a of the second magnet 41 is positioned closer to the upper surface of the turntable 15 than the attracting surface 40a of the first magnet 40. Accordingly, there is a difference or discontinuity in height between the attracting surface 40a of the first magnet 40 and the attracting surface 41a of the second magnet 41, indicated by the symbol ΔH shown in FIG. 5. The attracting surface 41a of the second magnet 41 is positioned low because the outer periphery of the turntable 15 is at a position that involves other structural elements, so the permissible height of the attracting surface 41a of the second magnet 41 is low.

Figure 7:
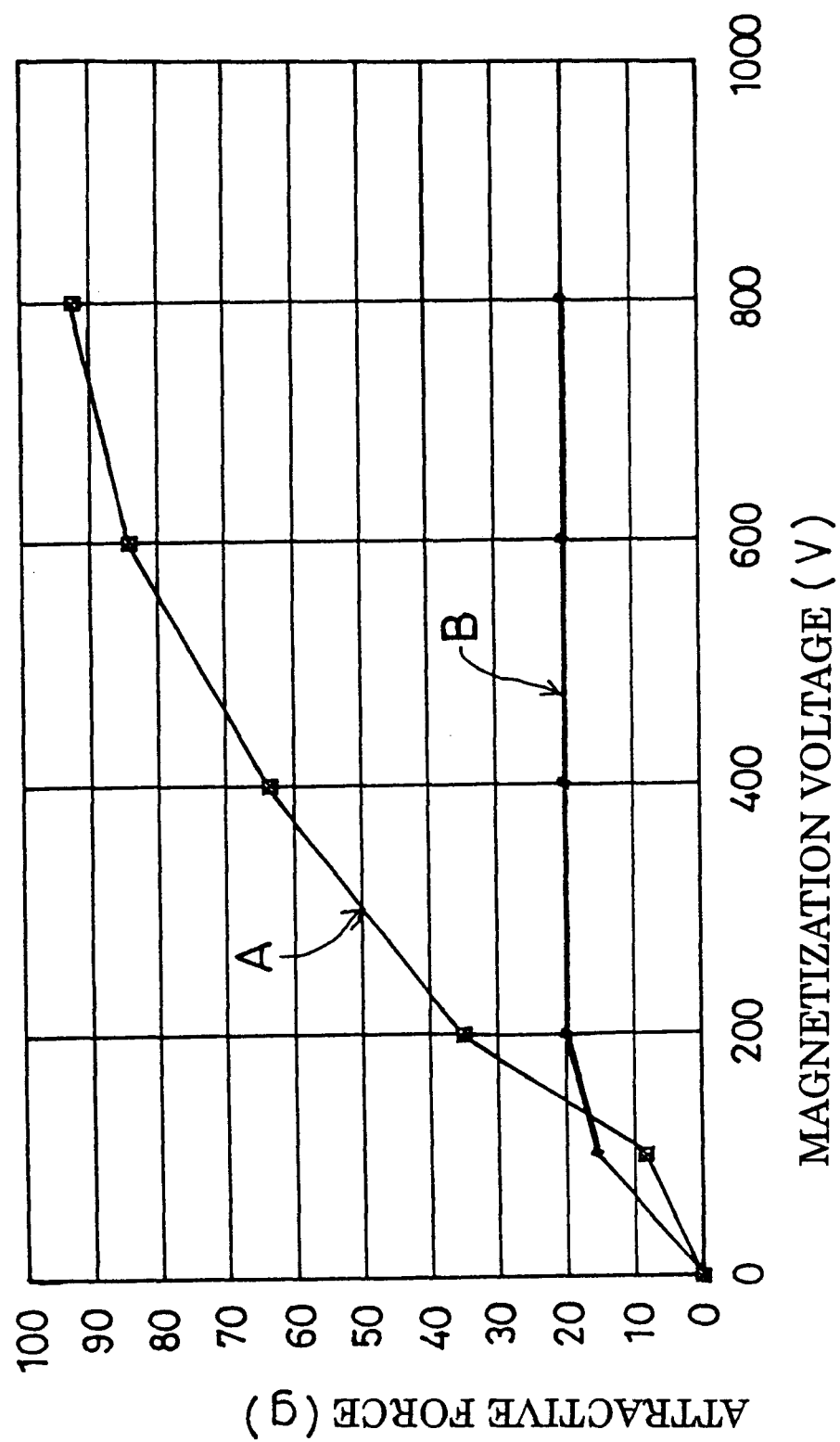
FIG. 7 is a chart showing the relation between attractive force and polarization voltage.

FIG. 7 shows the relation between the magnetization voltage and the attractive force of a neodym magnet on the one hand and a ferrite magnet on the other. In the drawing, arrow A indicates the properties of the neodym magnet and arrow B indicates the properties of the ferrite magnet. As shown in the drawing, the attractive force of the neodym magnet increases as the magnetization voltage increases. By contrast, the ferrite magnet reaches saturation at a magnetization voltage of approximately 200V, so the attractive force of the ferrite magnet does not increase beyond approximately 20 g even if the magnetization voltage is increased beyond 200V.

That is, it can be understood from the drawing that although the attractive force of the neodym magnet that is the first magnet 40 can be increased, the attractive force of the ferrite magnet that is the second magnet 41 cannot be increased. In the present embodiment, the attractive force of the first magnet 40 is set to be stronger than the attractive force of the second magnet 41.

A description will now be given of the operation of the disk chucking mechanism 10 having the structure described above, with reference to FIGS. 6A, 6B and 6C. FIG. 6A shows the structure of the essential portion of the disk chucking mechanism 10 described with reference to FIG. 4 and FIG. 5. FIG. 6B shows a state in which a lower grade or ordinary floppy disk 100A is loaded into the disk chucking mechanism 10. FIG. 6C shows a state in which an higher grade or high-density floppy disk 100B is loaded into the disk chucking mechanism 100B.

As shown in FIG. 6B, in a state in which the lower grade or ordinary floppy disk 100A is loaded into the disk chucking mechanism 10, the hub 102A of the lower grade or ordinary floppy disk 100A is attracted by the first magnet 40 and set upon the turntable 111.

At this time only the first magnet 40 attracts the bottom portion 107 of the hub 102A. The second magnet 41 is low and thin and the separation between the second magnet 41 and the hub 102A is large, so the second magnet does not attract the hub 102A.

In this state, in which the lower grade or ordinary floppy disk 100A has just been loaded, the spindle 30 ordinarily enters the chucking hole 104A. However, if the drive pin 34 does not align with the positioning hole 105 then it sometimes happens that the drive pin 34 does not enter the positioning hole. Nevertheless, once the disk motor 19 rotates the turntable 15 the rotation of the turntable 15 brings the positioning hole 105 into alignment with the drive pin 34, thus engaging the drive pin 34 with the positioning hole 105.

At this time, hub 102A is attracted only by the first magnet 40, so the force of the attraction is weak. As a result, the positioning force of the drive pin 34 positions the hub 102A and, accordingly, the turntable can be rotated with respect to the hub 102A. By thus engaging the positioning hole 105 and the drive pin 34, the rotational force of the disk motor 19 is transmitted to the hub 102A and the lower grade or ordinary floppy disk 100A rotates at a predetermined rotational speed.

FIG. 6C shows a state in which the higher grade or high-density floppy disk 100B is loaded into the disk chucking mechanism 10 at the same rotational speed as that for the lower grade or ordinary floppy disk 100A. In this loaded state, the spindle 30 enters the chucking hole 104B and the drive pin 34 is in a state of engagement with the hub hole 117.

Additionally, the central portion 108 of the hub 102B provided on the higher grade or high-density floppy disk 100B is attracted by the first magnet 40 and the ring-like projection 106 formed on the outer periphery of the hub 102B of the higher grade or high-density floppy disk 100B is attracted to the second magnet 41, thus setting the higher grade or high-density floppy disk 100B on top of the turntable 15.

At this time, the attracting surface 41a of the second magnet 41 is at a low position with respect to the turntable. However, a ring-like projection 106 is formed on the hub 102B of the higher grade or high-density floppy disk 100B, so in a loaded state this ring-like projection 106 is attracted to the attracting surface 41a of the second magnet 41. Accordingly, hub 102B can be made to attach to the second magnet 41.

According to the above-described disk chucking mechanism 10 according to the present embodiment, by providing a first magnet positioned along the inner periphery of the turntable 15 so as to attract both hub 102A and hub 102B of the lower grade or ordinary floppy disk 100A and the higher grade or high-density floppy disk 100B, respectively, the first magnet attracts hub 102A and hub 102B when both the lower grade or ordinary floppy disk 100A and the higher grade or high-density floppy disk 100B are loaded.

Additionally, according to the disk chucking mechanism 10 according to the present embodiment, by providing a second magnet 41 along the outer periphery of the turntable 15 in such a way that the second magnet 41 attracts only a ring-like projection 106 formed on the hub 102B of the higher grade or high-density floppy disk 100B, both the first magnet 40 and the second magnet 41 attract the hub 102B only when the higher grade or high-density floppy disk 100B is loaded.

As a result, as described above, when the lower grade or ordinary floppy disk 100A is loaded the attraction on the hub 102A is weak because only the first magnet 40 exerts an attraction on the hub 102A, the hub 102A rotates relative to the turntable 15 when the disk motor 19 is engaged, the drive pin 34 can be made to engage the positioning hole 105 and the positioning force of the drive pin 34 can position the hub 102A.

Additionally, when the higher grade or high-density floppy disk 100B is loaded, the attraction on the hub 102B is strong because both the first and second magnets 40 and 41 are exerting an attraction on the hub 102B. Accordingly, when the disk motor 19 is engaged and driven at high speed with high torque so as to accommodate high-density recording, the hub 102B can be positioned within a range bounded by the space between the spindle 30 and the chucking hole 104B and can be rotated in accordance with the rotation of the turntable 15.

It should be noted that in the embodiment described above the first magnet is a neodym magnet and the second magnet is a ferrite magnet. However, it is possible to use other magnets. In addition, an electromagnet may be used in place of a polarized magnet, with the magnetic force generated changed by changing the activating current.

Additionally, the shape of the magnets is not limited to that indicated in the above-described embodiment.

The above description is provided in order to enable any person skilled in the art to make and use the invention and sets forth the best mode contemplated by the inventor of carrying out the invention.

The present invention is not limited to the specifically disclosed embodiments and variations, and modifications may be made without departing from the scope of the present invention.

The present application is based on Japanese Priority Application No. 10-271979 filed on Sep. 25, 1998, the entire contents of which are hereby incorporated by reference.

What is claimed is:

1. A disk chucking mechanism for selectively chucking a first disk and a second disk onto a turntable, the first disk having a first hub which has a chucking hole into which and through which a spindle is inserted and a positioning hole into which and through which a drive pin is inserted, the second disk having a second hub which has a second chucking hole into which and through which a spindle is inserted and a ring-like projection, comprising:

a first magnet provided on an inner periphery of the turntable, the first magnet configured so as to attract the first hub and the second hub; and a second magnet provided on an outer periphery of the turntable, the second magnet having an attracting surface positioned further toward the outer periphery of the turntable than an attracting surface of the first magnet and opposite the projection formed on the second hub so as to attract only the second hub.

2. The disk chucking mechanism as claimed in claim 1, wherein the first magnet is a neodym magnet and the second magnet is a ferrite magnet.

3. A disk chucking mechanism for selectively chucking a first disk and a second disk onto a turntable, the first disk having a first hub which has a chucking hole into which and through which a spindle is inserted and a positioning hole into which and through which a drive pin is inserted, the second disk having a second hub which has a second chucking hole into which and through which a spindle is inserted and a ring-like projection, comprising:

a first attracting portion provided on an inner periphery of the turntable, the first attracting portion configured so as to magnetically attract the first hub and the second hub; and a second attracting portion provided on an outer periphery of the turntable, the second attracting portion having an attracting surface positioned further toward the outer periphery of the turntable than an attracting surface of the first attracting portion and opposite the projection formed on the second hub so as to magnetically attract only the second hub.

* * * * *